US011365824B2

(12) United States Patent
Underwood et al.

(10) Patent No.: US 11,365,824 B2
(45) Date of Patent: Jun. 21, 2022

(54) ADJUSTABLE FAIL-SAFE ROTARY SPRING OPERATOR WITH A RETAINING BAND

(71) Applicant: CONTROLS INTERNATIONAL, INC., Dallas, TX (US)

(72) Inventors: Frederick Rand Underwood, Dallas, TX (US); Frederick Rand Underwood, III, Dallas, TX (US); Kenneth Earl Price, Combine, TX (US)

(73) Assignee: Rotork Plc, Bath (GB)

( * ) Notice: Subject to any disclaimer, the term of this patent is extended or adjusted under 35 U.S.C. 154(b) by 0 days.

(21) Appl. No.: 16/177,341

(22) Filed: Oct. 31, 2018

(65) Prior Publication Data

US 2019/0072203 A1 Mar. 7, 2019

Related U.S. Application Data

(63) Continuation of application No. 14/873,922, filed on Oct. 2, 2015, now Pat. No. 10,145,489, which is a
(Continued)

(51) Int. Cl.
*F03G 1/02* (2006.01)
*F16F 1/12* (2006.01)
(Continued)

(52) U.S. Cl.
CPC ............... *F16K 31/12* (2013.01); *F03G 1/02* (2013.01); *F16C 3/02* (2013.01); *F16F 1/10* (2013.01);
(Continued)

(58) Field of Classification Search
CPC ... F03G 1/02; F16F 1/123; F16F 1/128; F16F 1/10; F16K 31/56; F16K 31/12;
(Continued)

(56) References Cited

U.S. PATENT DOCUMENTS

| 278,427 A | 5/1883 | Godley et al. |
| 299,979 A | 6/1884 | Godley |

(Continued)

FOREIGN PATENT DOCUMENTS

| CN | 103906958 | 10/2016 |
| CN | 106246995 | 12/2016 |

(Continued)

OTHER PUBLICATIONS

State Intellectual Property Office of the People's Republic of China; Second Office Action, issued in connection to 201610824674.2; dated Oct. 9, 2018; 3 pages; China.
(Continued)

*Primary Examiner* — Marina A Tietjen
(74) *Attorney, Agent, or Firm* — Greenberg Traurig, LLP; Dwayne L. Mason

(57) ABSTRACT

A rotary spring-return actuator operator is provided with a multi-slot shaft and a clock type spring retained by a retaining band which encircles the spring in such a manner as to insure that the potential energy within the spring is safely contained during all operations requiring disassembly of the actuator assembly, and wherein the retaining band facilitates the in-field reversal of the spring direction or the adjustment of the spring preload by securing the spring to one or more of the slots on the multi-slot shaft.

10 Claims, 8 Drawing Sheets

Related U.S. Application Data continuation of application No. 13/171,337, filed on Jun. 28, 2011, now Pat. No. 9,151,351.

(51) Int. Cl.
| | |
|---|---|
| *F16F 1/10* | (2006.01) |
| *F16K 31/12* | (2006.01) |
| *F16K 31/56* | (2006.01) |
| *F16C 3/02* | (2006.01) |
| *F16K 17/04* | (2006.01) |

(52) U.S. Cl.
CPC .............. *F16F 1/123* (2013.01); *F16F 1/128* (2013.01); *F16K 17/04* (2013.01); *F16K 31/56* (2013.01); *Y10T 29/49824* (2015.01); *Y10T 29/49863* (2015.01)

(58) Field of Classification Search
CPC ...... F16K 17/04; F16C 3/02; Y10T 29/49863; Y10T 29/49824
See application file for complete search history.

(56) References Cited

U.S. PATENT DOCUMENTS

| | | | | |
|---|---|---|---|---|
| 456,833 | A | | 7/1891 | Morse |
| 590,533 | A | | 9/1897 | Tarbox |
| 862,934 | A | | 8/1907 | Perkins |
| 1,350,754 | A | * | 8/1920 | Vasselli ............... F03G 1/02 185/45 |
| 1,584,060 | A | | 5/1926 | White |
| 1,595,286 | A | | 8/1926 | Boucher |
| 2,057,277 | A | | 10/1936 | Parsons |
| 2,559,264 | A | | 7/1951 | Stevens |
| 2,761,030 | A | | 8/1956 | Jeffrey |
| 2,804,173 | A | | 8/1957 | De Millar |
| 2,806,244 | A | | 9/1957 | Bernhard |
| 3,554,096 | A | | 1/1971 | Dejager |
| 3,625,502 | A | * | 12/1971 | Joerres ............... F16F 1/10 267/167 |
| 3,994,368 | A | * | 11/1976 | Langwell ............ F03G 1/00 185/11 |
| 4,130,182 | A | | 12/1978 | Aunspach |
| 4,232,837 | A | * | 11/1980 | Cutler .................. B65H 75/486 242/372 |
| 4,340,190 | A | | 7/1982 | Zavatkay |
| 4,478,313 | A | | 10/1984 | Wakase |
| 4,595,081 | A | | 6/1986 | Parsons |
| 4,595,184 | A | * | 6/1986 | Bohm .................. G01R 17/08 185/45 |
| 4,782,811 | A | | 11/1988 | Hewette et al. |
| 4,825,840 | A | | 5/1989 | Hewette et al. |
| 4,848,652 | A | | 7/1989 | Kennedy |
| 4,895,301 | A | | 1/1990 | Kennedy |
| 4,915,083 | A | | 4/1990 | Hewette |
| 4,964,273 | A | | 10/1990 | Nash |
| 5,363,876 | A | | 11/1994 | Nash |
| 5,450,932 | A | | 9/1995 | Nash |
| 5,458,148 | A | | 10/1995 | Zelczer et al. |
| 5,984,057 | A | | 11/1999 | Nash |
| 6,062,548 | A | | 5/2000 | Nagao et al. |
| 6,289,787 | B1 | | 9/2001 | Underwood et al. |
| 6,393,931 | B1 | | 5/2002 | Spangenberg |
| 6,708,720 | B2 | | 3/2004 | Chapman |
| 6,725,975 | B2 | | 4/2004 | Chapman |
| 7,229,068 | B2 | | 6/2007 | Moilanen |
| 9,151,351 | B2 | | 10/2015 | Underwood et al. |
| 10,145,489 | B2 | | 12/2018 | Underwood et al. |
| 10,228,073 | B2 | | 3/2019 | Underwood et al. |
| 2006/0238039 | A1 | | 10/2006 | Niedermeyer et al. |
| 2008/0153605 | A1 | | 6/2008 | Liao |
| 2009/0166462 | A1 | | 7/2009 | Chang |
| 2011/0051565 | A1 | * | 3/2011 | Schmiedchen ...... G04B 18/023 368/173 |
| 2012/0106303 | A1 | | 5/2012 | Von Gunten et al. |
| 2013/0004358 | A1 | | 1/2013 | Underwood et al. |
| 2014/0308065 | A1 | * | 10/2014 | DeHarde ................ A61F 5/013 403/113 |
| 2016/0161016 | A1 | | 6/2016 | Underwood et al. |
| 2016/0161021 | A1 | | 6/2016 | Underwood et al. |
| 2017/0002798 | A1 | * | 1/2017 | Chapman ............... F16K 17/04 |
| 2018/0304963 | A1 | * | 10/2018 | Howe ..................... B62M 1/36 |

FOREIGN PATENT DOCUMENTS

| | | |
|---|---|---|
| EP | 2726766 | 3/2018 |
| GB | 927221 | 5/1963 |
| GB | 946785 | 1/1964 |
| GB | 2245313 | 1/1992 |
| GB | 2270363 | 3/1994 |
| GB | 2278416 | 11/1994 |
| WO | 2011/026725 | 3/2011 |
| WO | 2013/008066 | 1/2013 |

OTHER PUBLICATIONS

State Intellectual Property Office of the People's Republic of China; Notification of the First Office Action, issued in connection to 201610824674.2; dated Feb. 9, 2018; 10 pages; China.

European Patent Office; International Search Report and Written Opinion, issued in connection to PCT/IB2012/001286; dated Nov. 2, 2012; 16 pages; Europe.

The International Bureau of WIPO; PCT International Preliminary Report on Patentability, issued in connection to PCT/IB2012/001286; dated Jan. 7, 2014; 10 pages; Switzerland.

European Patent Office; Communicaiton pursuant to Article 94(3) EPC, issued in connection to EP12743218.5; 5 pages; Europe, dated Nov. 3, 2016.

* cited by examiner

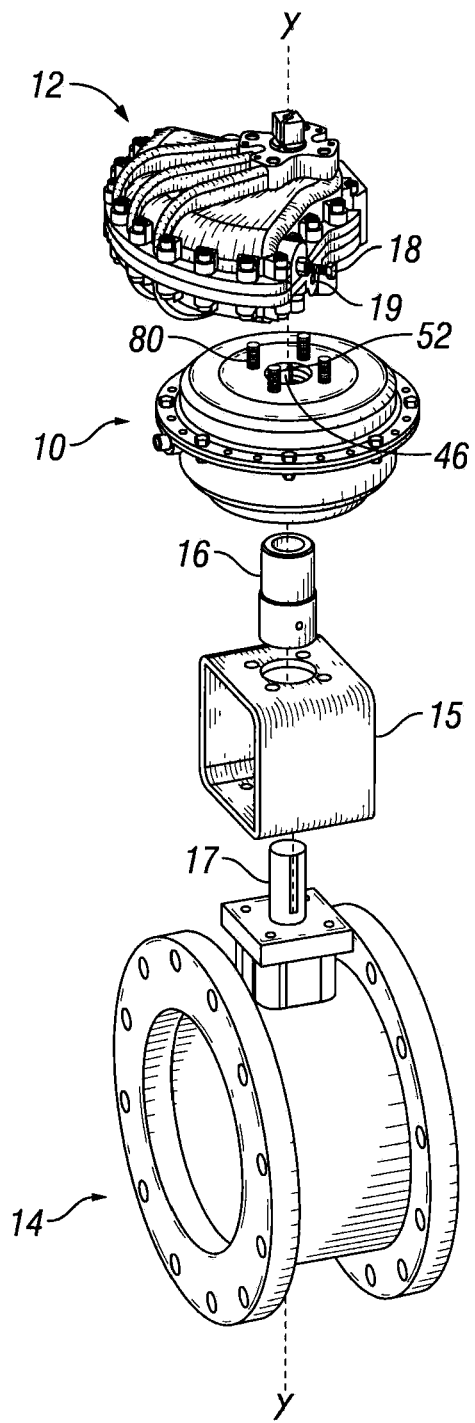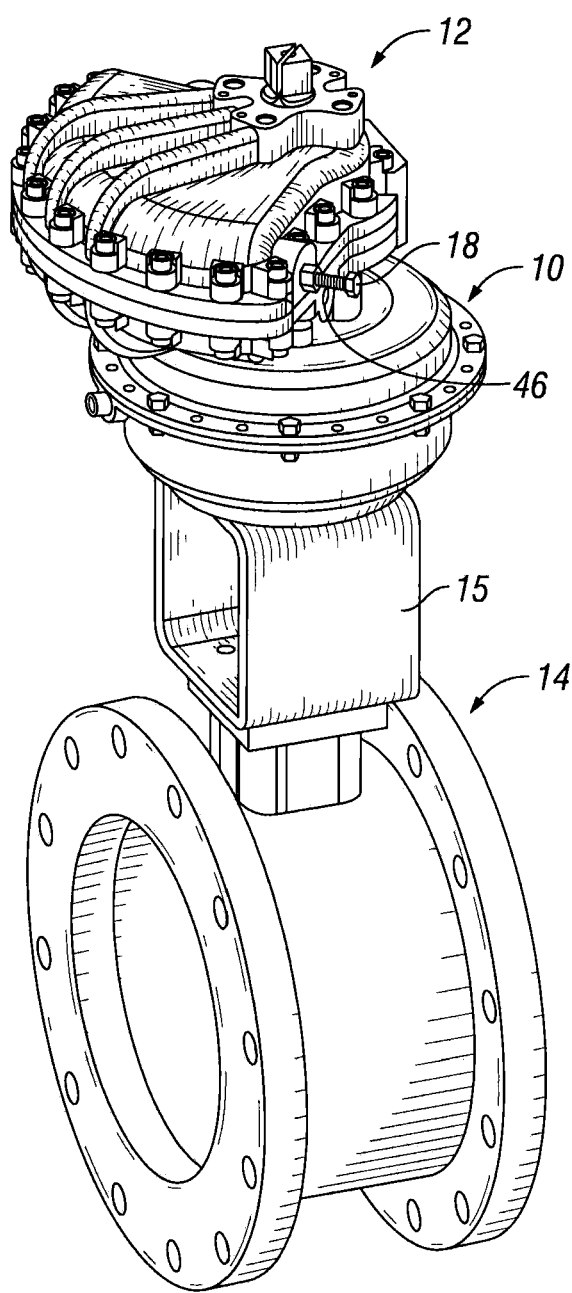
FIG. 1A
FIG. 1B

ADJUSTABLE FAIL-SAFE ROTARY SPRING OPERATOR WITH A RETAINING BAND

CROSS-REFERENCE TO RELATED APPLICATIONS

This application is a continuation of U.S. Non-Provisional application Ser. No. 14/873,922 filed on Oct. 2, 2015, which is a continuation of U.S. Non-Provisional application Ser. No. 13/171,337 filed on Jun. 28, 2011, now U.S. Pat. No. 9,151,351, the contents of each of which are incorporated by reference herein in their entirety.

BACKGROUND

The field of invention relates to rotary spring-return operators. Flat or power springs have long been used as stand alone mechanical fail-safe devices. A spring return operator can also convert a double acting actuator to a fail safe single acting actuator when used in conjunction with, or coupled to, various types of power actuators, such as electric, pneumatic or hydraulic, to apply a torque to rotate a shaft that is coupled with, or otherwise engaged to, the shaft of the said various power actuators when desirable. For instance, spring-return actuators are commonly used as a fail-safe assembly to rotate a device, such as a valve, to a predetermined "open" or "close" position, in the event of the interruption or failure of the air, water, or electrical supply to the pneumatic, hydraulic, or electric actuators, respectively.

When used as a stand alone device a spring return operator typically returns a device such as a manually operated valve to a pre-determined safe condition. The spring return operator can be directly mounted to the device or can be adapted by means of linkage. To convert a double acting actuator to a single acting fail safe actuator take a spring-return operator coupled with a pneumatic actuator as an example, the air pressure applied to the pneumatic actuator will hold a device, typically a valve, in its normal operating position. Upon a loss of air pressure to the pneumatic actuator, the rotary spring return fail-safe operator rotates the device to a safe condition, which depending on the specific application, could be an open or a close position.

The use of a rotary spring-return operator requires a minimum amount of energy to be stored in the spring, also referred to as the spring preload, before the actuator can be operationally assembled to serve its desired purpose as an integral part of a larger assembly. The inadvertent release of the stored energy stored in the spring, such as a sudden spring pop-out during disassembly, has caused serious injuries to personnel and equipment. Therefore, for reasons of safety, it is desirable that appropriate provisions be made to prevent the inadvertent and potentially hazardous release of the stored energy within the spring of a rotary spring actuator. The preferred embodiment described below is designed in such a manner to eliminate all inadvertent and potentially hazardous release of the spring's stored tension.

Moreover, it is desirable, and at times necessary, to make adjustments to the spring-return actuators in the field, such as adjusting the spring preload, or the direction of the spring-return actuator's output rotation. In addition to the preferred embodiments' safety features described herein, the preferred embodiment also enables a user to flexibly, yet safely, make in-field adjustments to the spring rotary spring-return actuator assembly as desirable or necessary.

BRIEF SUMMARY OF THE INVENTION

When a wound rotary spring-return operator is engaged with a power actuator in driving relation, the torque applied by the spring is of such a magnitude as to effectively rotate a device, such as the shaft of a valve, in the absence of a counter force applied to the shaft via the pneumatic, hydraulic or electric control actuator (coupled with the spring return operator). As such, the use of a rotary spring-return operator as explained requires a minimum amount of energy to be stored in the spring. Depending on the specific purpose served by the spring-return operator, or the specific device to which the spring-return operator is coupled to, it may be necessary to make adjustments to the spring's tension prior to being functionally installed, also referred to as the spring preload.

The subject spring-return operator has been designed in such a manner to eliminate all inadvertent and potentially hazardous release of the spring's stored tension during adjustment or disassembly by incorporating a retaining band that securely surrounds or encapsulates the spring. In addition to the enhanced safety features, the retaining band also facilitates a safe and feasible methodology to reverse the rotational direction of the spring-return operator's output in the field.

Moreover, the retaining band allows the user to safely and conveniently remove the power spring assembly from the housing, allowing the user, for example, to adjust the spring preload in the field. Adjusting the spring preload is traditionally done by rotational clocking of the actuator, such as a pneumatic or hydraulic vane actuator, to the spring housing using a multi-hole pattern in the spring cover plate. One problem with methodology is that the spring shaft is timed to the actuator shaft, when the spring housing is clocked the mounting holes are no longer timed with the spring shaft. Typically the spring operator is mounted between the power actuator and the device being actuated, such as a flow control valve, and a linkage has to be manufactured to allow for the explained timing discrepancy. Consequently, if a preload change is required in the field, then the linkage will have to be remade. One preferred embodiment of the present invention avoids this timing problem by utilizing a multi-slot shaft in the spring-return operator to allow for the spring preload to be incrementally adjusted while maintaining the shaft to mounting bolt pattern orientation. This methodology is made feasible by the retaining band used in the preferred embodiment, used to contain the spring's stored energy, thus allowing for easy disassembly of the spring-return operator so that the shaft can be clocked to the correct starting position in order to obtain the correct preload.

A preferred embodiment of the present invention is a rotary spring-return operator comprising a housing having side walls, an end wall at one end thereof and open at its other end, a cover plate disposed in closing relationship with respect to the open end of the housing, a rotatable shaft having one end journaled to said end wall, a coil spring interposed between and secured relative to said shaft and the interior of said housing, and a retaining band securely encapsulating the spring.

Another preferred embodiment of the present invention is rotary spring-return operator comprising a housing having side walls, an end wall at one end thereof and open at its other end, a cover plate disposed in closing relationship with respect to the open end of the housing, a rotatable multi-slot shaft having one end journaled to said end wall; and a coil spring interposed between said shaft and the interior of said housing. This preferred embodiment may further comprise a retaining band to contain the energy stored in the spring thereby facilitating the removal of the spring from the housing when necessary.

Another preferred embodiment of the present invention is a rotary spring-return operator which comprises a housing having side walls, an end wall at one end thereof and open at its other end, a cover plate disposed in closing relationship with respect to the open end of the housing, a rotatable multi-slot shaft having one end journaled to said end wall, coil spring means interposed between and secured relative to said shaft and the interior of said housing, and a retaining band encapsulating the spring and secured to the side wall of the housing.

An embodiment of the present invention is also a retaining band for use in a rotary spring-return operator comprising a housing, a shaft rotatably journaled therein, and a spring interposed between and secured relative to said shaft and the housing, wherein the retaining band encapsulates the spring, and is used to secure the spring to the housing.

Another embodiment of the present invention is a multi-slot shaft designed for use in a rotary spring-return operator which includes a housing that rotatably receives the shaft and a spring interposed between and secured relative to said shaft and the housing, wherein the multi-slot shaft can be utilized to adjust the preload on the spring-return operator.

A further embodiment of the present invention is a method for safely reversing the our direction of a spring-return operator including a coil spring retained in a retaining band housed in a spring housing comprising the steps of releasing all the tension on the spring, disassembling the spring housing, removing the spring retained by the retaining band from the housing, flipping the spring 180 degrees; and reassembling the spring housing.

Another embodiment of the present invention is a method for safely adjusting the spring preload of a spring retained in a retaining band, housed in a spring housing, and secured to a multi-slot shaft comprising the steps of releasing the tension on the spring, disassembling the spring housing, removing the spring retained by the retaining band, adjusting the multi-slot shaft according to a desirable spring preload, securing the spring to a vertical slot on the multi-slot shaft corresponding to the desirable spring preload, and reassembling the spring housing.

The preferred embodiment of the present invention is also a method for safely unwinding the spring of a spring-return operator and reversing the direction of a spring retained by a retaining band used in a rotary spring-return assembly coupled to a vane actuator, comprising the steps of allowing the spring to rotate a vane of the vane actuator to move fully in a first direction, (1) using a retainer device to lock the spring-return operator, (2) disengaging the spring return operator from the vane actuator, (3) applying force to rotate the vane of the vane actuator fully in a second direction, opposite to the first direction, (4) reengaging the spring return operator and the vane actuator, (5) applying force to the vane of the vane actuator in the second direction until the spring and the actuator torques are in balance, (6) removing the retainer device, (7) removing the force applied to the vane to allow the spring to rotate the vane actuator fully in the first direction, repeating steps (1) through (7) until all spring tension is released, disassembling the rotary spring-return assembly; inverting the retained spring 180 degrees; and reassembling the rotary spring-return operator.

Finally, the preferred embodiment includes a method for safely winding the spring after the spring reversal or any desired preload adjustments comprising the steps of allowing the vane of the vane actuator to move fully in the second direction, (1) reengaging the spring return operator and the vane actuator, (2) applying force to rotate the vane fully in the first direction, (3) using the retainer device to lock the spring-return operator, (4) disengaging the spring return operator from the vane actuator, (5) applying force to rotate the vane fully in the second direction, opposite to the first direction, (6) reengaging the spring return operator and the vane actuator, (7) applying force to the vane of the vane actuator in the first direction until the spring and the actuator torques are in balance, (8) removing the retainer device, (9) applying force to the vane to rotate the vane fully in the second direction; and Repeating steps (1)-(9) until the spring is wound as desired. In a preferred embodiment, steps (1)-(9) may be repeated until the force to balance the spring and the actuator is half the supplied air pressure (80 psi upper supply pressure limit).

BRIEF DESCRIPTION OF THE DRAWINGS

A better understanding of the present invention can be obtained when the following detailed description of the preferred embodiment is considered in conjunction with the following drawings, in which:

FIG. 1A is a perspective view illustrating a power actuated mechanism, in this instance a pneumatic vane actuator, operatively associated with a rotary spring-return operator, which is in turn operatively coupled with a conventional valving member. FIG. 1B is an exploded view of the same.

DETAIL DESCRIPTION OF THE PREFERRED EMBODIMENTS

Figure 2A:
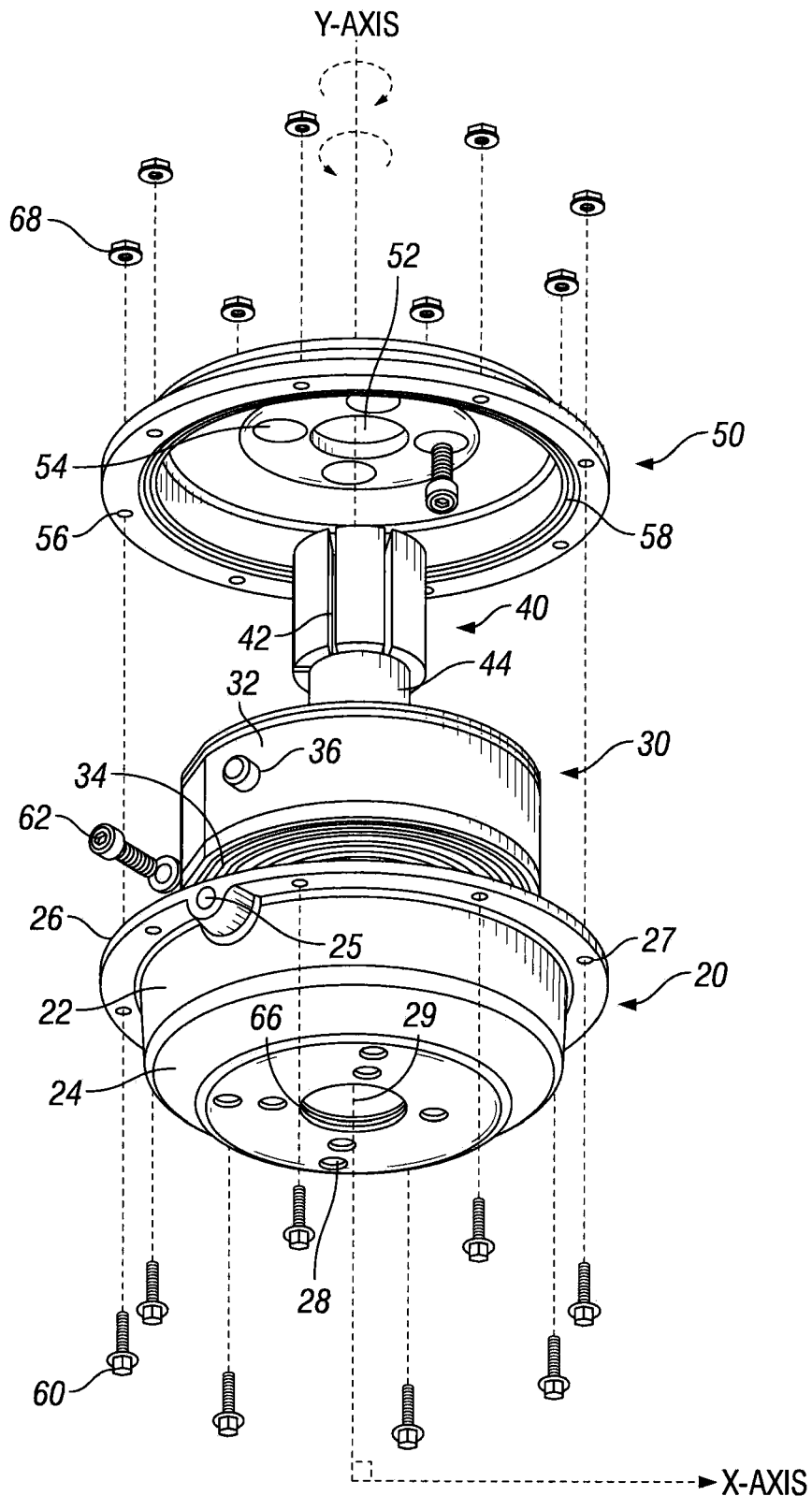
FIG. 2A is a perspective angled exploded view of the rotary spring return operator.

Detailed embodiments of the present apparatus and method are disclosed herein; however, it is to be understood that the disclosed embodiments are merely illustrative of the apparatus and method that may be embodied in various forms. As such, the specific structural and functional details disclosed herein are not to be interpreted as restrictive or limiting, but merely as a representative basis for teaching one skilled in the art to variously employ the present invention.

As illustrated in FIG. 1A and FIG. 1B, the rotary spring-return operator 10 may be securely, though releasably, fastened or coupled to the housing of a power actuator 12, which in this example, is a pneumatic vane actuator. The present invention is directed to a rotary spring-return operator 10 a preferred embodiment of which is illustrated herein, and is neither limited to, concerned with, nor directed to, the specific structural details of the power actuator 12 or the valving member 14. However, the structural details of the pneumatic vane actuator 12, are illustrated in the U.S. Pat. No. 6,289,787 to Underwood et al., and assigned to K-Tork International, Inc., which is incorporated herein by reference.

In the preferred embodiment, the rotary spring-return operator 10 may be securely, though releasably, fastened or coupled to the plug shaft 17 of a conventional valving member 14 using a coupling adapter 16 and a bracket 15 as necessary. If the plug shaft 17 may be directly and compatibly mated or fitted with the shaft 40 of the spring-return operator 10, the rotary spring-return operator 10 may be securely, though releasably, fastened or coupled to the plug shaft 17 and thus the valving member 14 without using the coupling adapter 16 and bracket 15. The rotary spring-return operator 10 and the power actuator 12 may be disposed in driving relation each other, and with plug shaft 17 of conventional valving member 14. For example, the pneumatic vane actuator 12 may maintain the valving member 14 in a normal operating condition using air pressure received through the vane actuator's opening 19 and exerting a force equal or greater than, and in the opposite direction to, the output force of spring return operator. In case of a loss of power to the power actuator, which in this case would be a loss of air pressure to the vane actuator, the rotary spring-return operator 10 rotates the valving member 90 degrees or less depending on the position of the stop bolt of the vane actuator 18, to a safe condition, which depending on the specific application, could be an open or a close position.

Figure 2B:
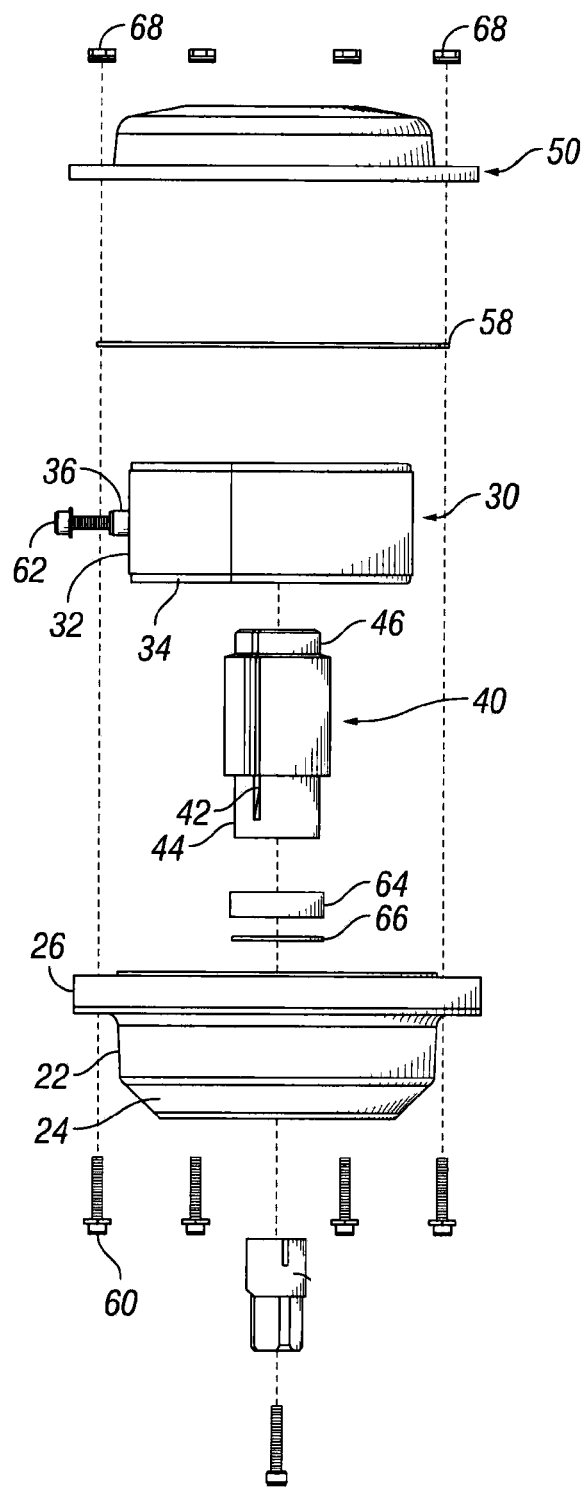
FIG. 2B is a perspective side exploded view of the rotary spring return actuator.
Figure 3:
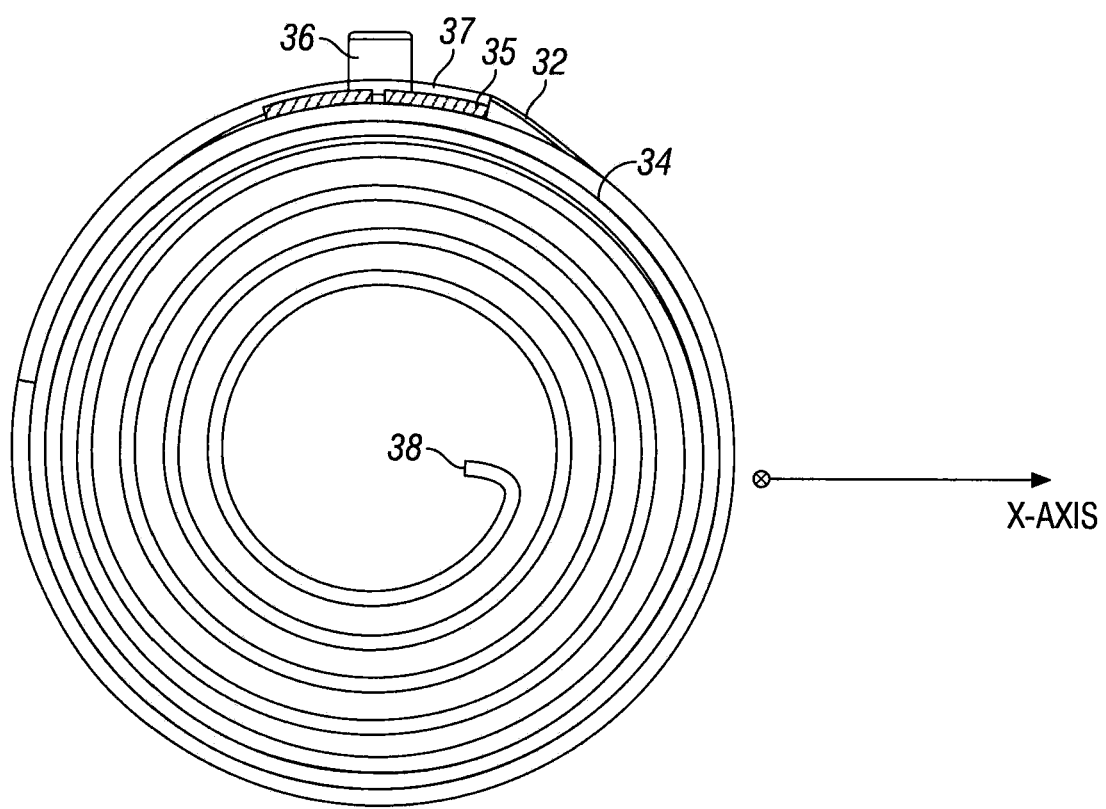
FIG. 3 is a top view of the spring assembly illustrating a coil spring contained in a retaining band secured around the spring using an anchor nut.

As illustrated by FIG. 2, the rotary spring-return operator 10 may be mainly comprised of a spring housing 20, a power spring assembly 30, a shaft 40, and a spring cover-plate 50. FIG. 3 further illustrates the power spring assembly 30, wherein a retaining band 32, made out of material capable of withstanding and thus retaining the maximum possible force which may be stored in the spring 34, encircles, encapsulates, or is otherwise securely fastened around a coil spring 34 using a support plate 35 an anchor nut 36, thus retaining the energy stored in the spring. In a preferred embodiment, the retaining band may be made out of steel. The inner bent-shaped end of the spring 38 is designed to be securely and slideably received within a vertical slot 42 in shaft 40 to facilitate the transfer of the spring's stored energy to rotate the shaft 40 in a clock-wise or counter clock-wise direction around the Y-Axis, depending on the rotational direction of the spring's output force.

Figure 4A:
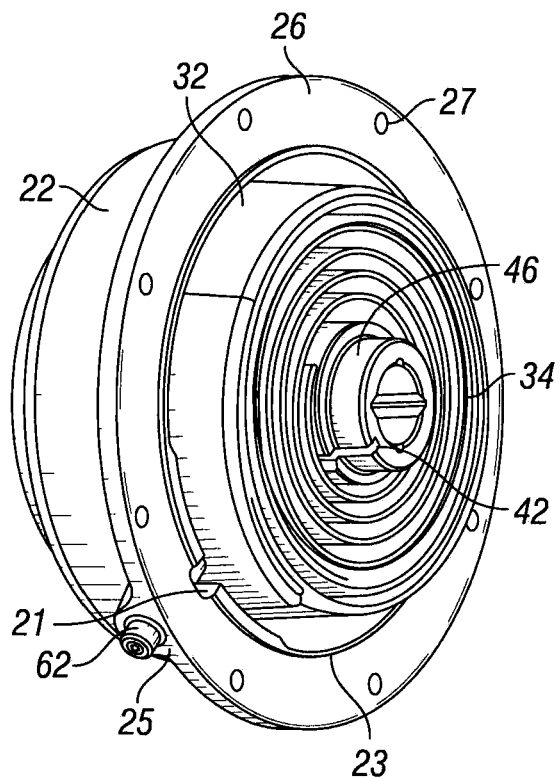
FIG. 4A is a angled-side view of the spring housing assembly comprising of the spring housing, which houses the spring assembly secured to it by a bolt 62 received by the anchor nut 36, and which through a central opening in the housing receives the shaft 40, which is also secured to the spring assembly.
Figure 4B:
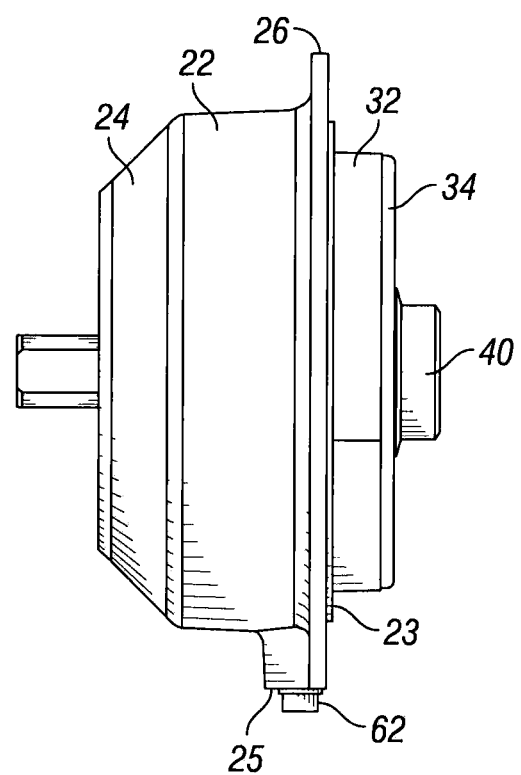
FIG. 4B is the side view of the same.

As further illustrated by FIG. 2, FIG. 4A, and FIG. 4B, the spring housing 20 may be a substantially u-shaped housing having a circular side wall 22, an end wall 24 at one end of the side wall 22, wherein the other or opposite end of the side wall 22 may be open to receive the power spring assembly 30. One embodiment of the present invention may include a flange 26, that may circumscribe the lower, open end, of the side wall 22, and gasket 23 which may be interposed between corresponding surfaces of the spring cover plate 50 and the outer end of side wall 22. A central opening 29 may be provided in the end wall 24 which may house a bearing 64 to receive the lower end of the shaft 44 in a slip-fit manner. In the preferred embodiment, an O-ring 66 may be received within an O-ring receptive groove of the central opening 29 for providing an air- or fluid-tight fit between the one end of shaft 40 and the spring housing 20.

As illustrated in FIG. 2A, FIG. 2B, FIG. 4A, and FIG. 4B, the shaft 40 may be slideably received in the inner part of the spring 34 wherein the inner end of the spring 38 may be received within a vertical slot 42 of shaft 40 thereby attaching or securing, though releasably, the power spring assembly 30 and the shaft 40. The power spring assembly 30 and the shaft 40 attached or secured thereto are in turn disposed within spring housing 20, with the spring 34 received on the inside surface of the end wall 24 and the lower end of the shaft 44 received in end wall's central opening 29. In the preferred embodiment, the lower end of the shaft 44 may be slip-fittedly received in a bearing 64 housed in the end wall's central opening 29. The anchor nut 36 may be slideably received within a vertical slot 21 in the spring housing circular side wall 22 and may be accessed through the side wall opening 25. A bolt 62 is projected through the side wall opening 25 and mated with the anchor nut 36 on the retaining band 32 securing together the spring housing 20 and the power spring assembly 30. The assembly depicted in FIGS. 4A and 4B, illustrating the shaft 40, releasably secured to the power spring assembly 30 which is in turn secured to the spring housing 20 by a bolt 62 is herein referred to as the spring housing assembly.

A spring cover-plate 50 may define the removable top portion of the spring-return operator 10. A central opening 52 may be provided in the cover-plate 50 to receive the upper end of the shaft 46. The preferred embodiment may also include an O-ring 58 which may be received within an O-ring receptive groove in the lower end of the cover-plate 50 for providing an air- or fluid-tight fit between the spring housing 20 and the cover-plate 50, and the spring-return operator 10 in general. The openings 54 in the cover-plate may be used to secure or fasten the cover plate with a power actuator using bolts 90, thus securing and engaging the spring-return operator 10, with a power actuator, such as a pneumatic vane actuator 12 as shown in FIG. 1B. The spring housing assembly of FIG. 4 may be securely fastened, by means of bolts 60, which project through openings in the peripheral flange 27 and the openings in the lower end of the cover plate 56, and may be mated or otherwise secured with nuts 68.

Figure 5A:
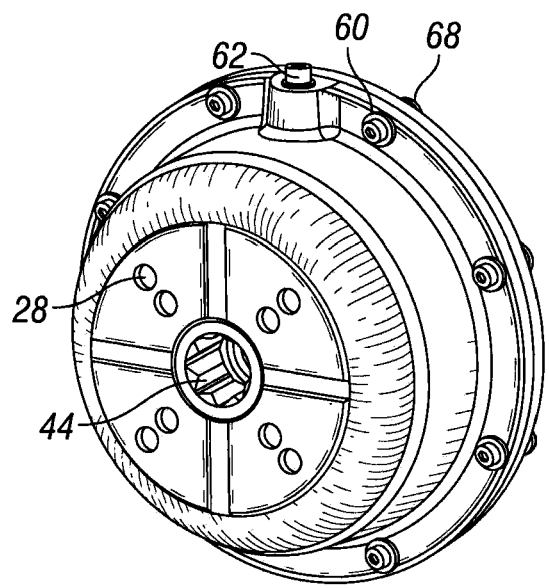
FIG. 5A is an angled-top view of the rotary spring-return operator, on the side of the spring housing.
Figure 5B:
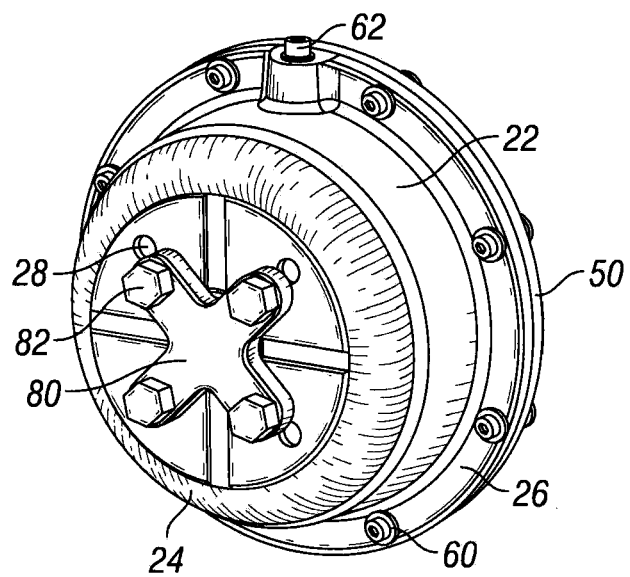
FIG. 5B is an angled-top view of the same, except that a spring retaining device 80 is inserted through the central opening of the housing to lock the shaft 40 and thus the spring in place.

As illustrated in FIG. 5 a retainer device 80 may be slideably mated, fitted, or coupled with the bottom side of the shaft 44 and securely screwed or fastened to the spring housing 20 using bolts 82 that may be tied into the threaded openings 28 of the spring housing's end wall 24. With the retainer device fitted or mated with the bottom side of the shaft 44 and thus the shaft itself 40, and secured to the spring housing, the shaft 40, and thus the spring 34 to which it is secured, may be locked in place within the spring housing 20, allowing for the safe unfastening and removal or separation of the spring housing assembly from the cover-plate 50 by loosening and removing the nuts 68 and bolts 60, and thus disengaging the spring housing assembly from the power actuator 12.

The ability to lock the spring using the retainer device allows for the safe and in-the-field manual winding and unwinding of the spring-return power operator 10. To illustrate the unwinding of the spring, with respect to the assembly depicted in FIGS. 1A and 1B as an example, the spring-return operator 10 is illustrated as coupled with a pneumatic vane actuator 12 and a valving member 14, and to unwind the spring 34, the shaft 40 is rotated in a counter-clockwise output direction around the Y-Axis for the spring-return 10 and the depicted vane actuator 12. Once the spring is unwound, the coupled or engaged vane actuator 12 and spring-return operator 10 may be unfastened and removed or separated from the valving member 14 by undoing or removing whatever means was used to secure and engage the spring-return operator to the plug shaft 15 of the valving member 14. Removing the air pressure applied to the air port opening of vane actuator 19 allows the spring-return operator to rotate shaft and the vane of the vane actuator 12 counter-clockwise as far as allowed by the stop bolt 18, thus partially or fully unwinding the spring 34. As illustrated in FIG. 5 and explained above, the spring retainer device may be used to lock the shaft 40, and thus the spring 34, in place. With the spring locked, nuts 68 bolts 60 may be removed, and the spring housing assembly removed, separated or disengaged from the cover-plate 50 and the vane actuator 12. With the housing assembly removed, separated or disengaged, air pressure through the vane actuator air port opening 19 may be used to fully rotate the vane of the vane actuator in the clockwise direction, and thus away from the opening 19 and the stop bolt 18. The housing assembly may then be reengaged with the vane actuator 12 and securely fastened to the cover-plate using bolts 60 and nuts 68 thereby reengaging the spring-return actuator 10 and the vane actuator 12. Air pressure may thereafter be applied through the air port opening 19 until the spring and the actuator torques are in balance. With the spring and the actuator torques in balance, the spring retainer bolts 82 may be removed and the spring retainer device 80 removed, separated, or disengaged from the shaft 40. The air pressure applied through the air port opening 19 may then be removed thereby allowing the spring 34 to rotate the shaft 40 and thus the vane of the vane actuator in the counter-clockwise direction as far as allowed by the stop bolt 18. The aforementioned steps may be repeated to release the entire tension of the spring 40. The foregoing description is only an example of releasing the spring tension utilizing a pneumatic vane actuator and as such, the embodiments of the present invention may utilize other actuators or devices in releasing the spring tension.

Once the spring's tension is released as described above, the retaining band 32 provides for the safe removal of the spring assembly from the shaft 40 and spring housing 20 once the bolt 62 is removed from the anchor nut 36. As such, the direction of the spring output rotation may be reversed by simply rotating the spring 34 180 degrees along the X-Axis. Therefore, the retaining band enables the user to reverse the output direction of the spring-return actuator 10 in the field.

Figure 6A:
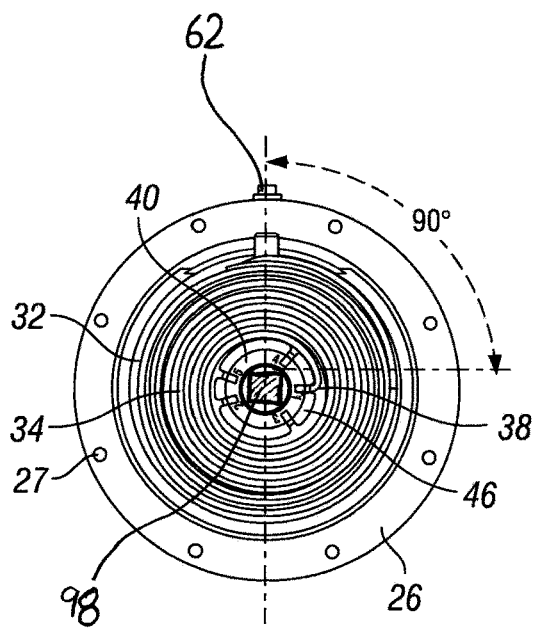
FIGS. 6A to 6E are the top view of the spring housing assembly of FIG. 3, showing five different spring preload setting configurations using the five slots of a multi-slot shaft 40.
Figure 6B:
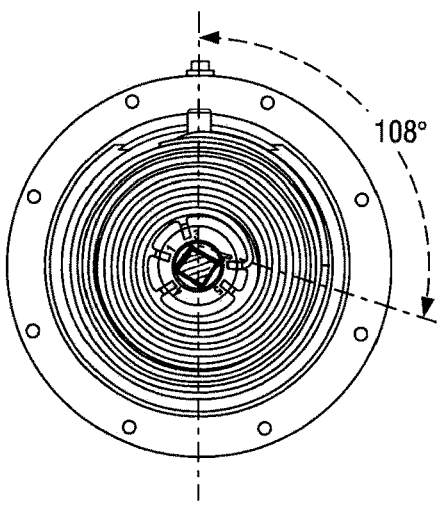
Figure 6C:
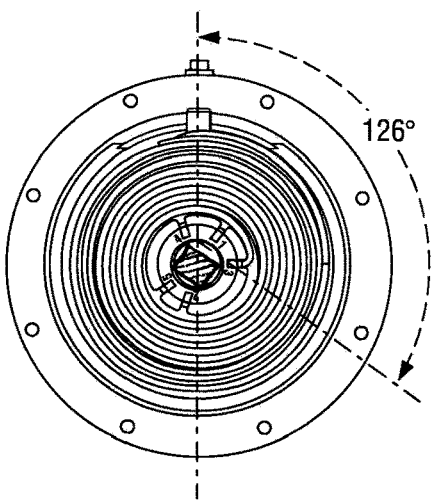
Figure 6D:
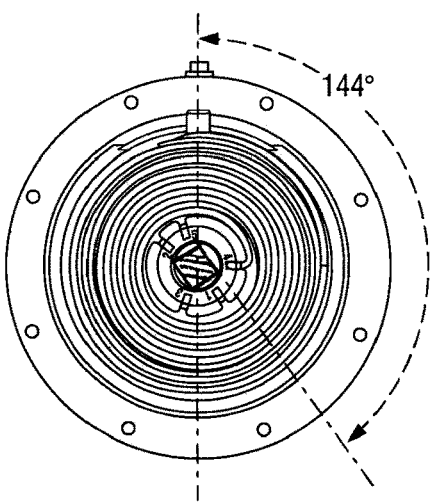
Figure 6E:
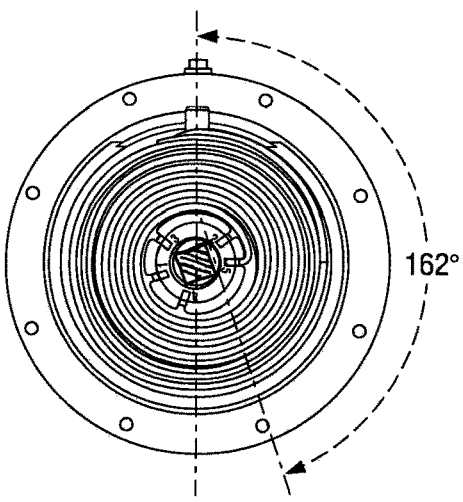

As illustrated in FIGS. 6A-6F, the multi-slot shaft 40 of the preferred embodiment enables the user to adjust the spring preload to accommodate different air supply pressures to the spring-return operator 10. FIG. 6A illustrates the bent-shaped end part of the spring 38 secured to slot 1 which represents the assembly at 0% reduction in spring preload. The bolt 62 may be removed and the spring 34, retained in the retaining band 32, may be slideably removed, separated, or disengaged from the shaft 40. The shaft 40 may then be rotated such to allow the bent-shaped end part of the spring 38 be slideably secured to slot 2 as illustrated in FIG. 6B. As also illustrated in FIG. 6B, slot 2 correspond to a 18 degree clockwise reorientation of the shaft, as illustrated by the orientation of the square cavity 98 within the shaft, used for illustration purposes only. This adjustment allows for a 4% reduction in spring preload. As further illustrated in FIGS. 6C-6E, securing the bent-shaped end part of the spring 38 to slots 3, 4, or 5 of the shaft 40 results in a 8%, 12%, or 16% reduction in the spring preload, respectively.

Once the direction of the spring is reversed, or the spring is secured to the appropriate slot on the shaft corresponding to a desirable spring preload, the spring made be wound using a similar methodology. To illustrate the winding of the spring, again take the assembly depicted in FIG. 1 as an example, wherein the spring-return operator is coupled with a pneumatic vane actuator 12 and a valving member 14, and similarly assume a counter-clockwise output direction around the Y-Axis for the spring-return 10 and the vane actuator 12. With the vane actuator 12 rotated fully counter-clockwise, couple or engage the spring-return operator 10 with the vane actuator 12. Air pressure through the vane actuator air port opposite to the air port opening 19 may now be applied to fully rotate the vane of the vane actuator in the clockwise direction, and thus away from the opening 19 and the stop bolt 18. As illustrated in FIG. 5 and explained above, the spring retainer device may be used to lock the shaft 40, and thus the spring 34, in place. With the spring locked, nuts 68 bolts 60 may be removed, and the spring housing assembly removed, separated or disengaged from the cover-plate 50 and the vane actuator 12. With the housing assembly removed, separated or disengaged, air pressure through the vane actuator air port opposite to the air port opening 19 may be applied to fully rotate the vane of the vane actuator in the counter-clockwise direction, and towards the air port opening 19 and the stop bolt 18. The housing assembly may then be reengaged with the vane actuator 12 and securely fastened to the cover-plate using bolts 60 and nuts 68 thereby reengaging the spring-return operator 10 and the vane actuator 12. Air pressure may thereafter be applied through the air port opposite to the air port opening 19 until the spring and the actuator torques are in balance. With the spring and the actuator torques in balance, the spring retainer bolts 82 may be removed and the spring retainer device 80 removed, separated, or disengaged from the shaft 40. Air pressure through the air port opening 19 may then be applied to move the vane actually fully clockwise thereby winding the spring 34. The aforementioned steps may be repeated to wind the spring 40 to a desirable level. In a preferred embodiment, the spring may be wound until the air pressure to balance the spring and the actuator is half the supplied air pressure (80 psi upper supply pressure limit).

Figure 7:
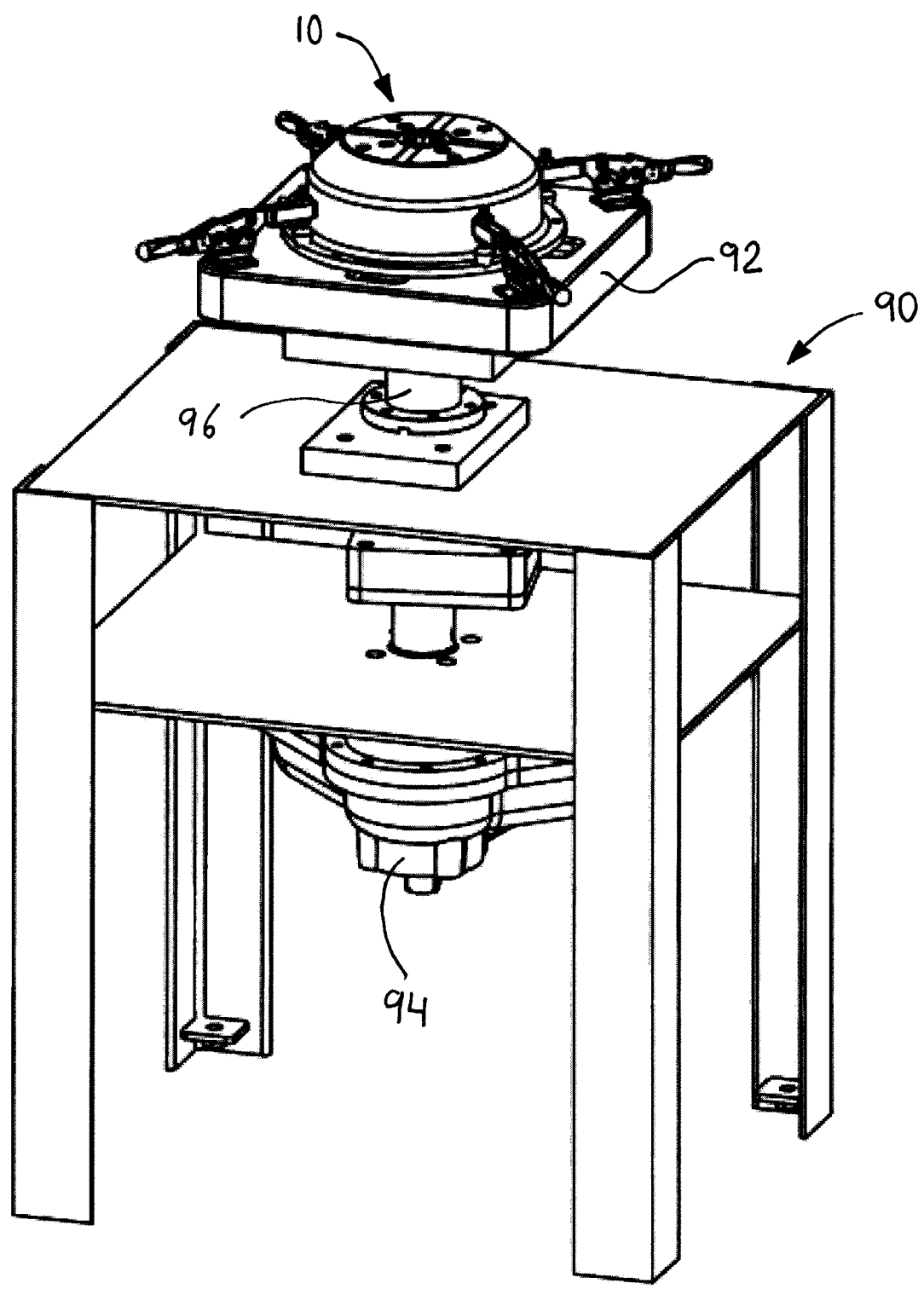
FIG. 7 is the side view of an device that may be used to wind or unwind the spring of the spring return operator.

The foregoing disclosure and description of various embodiments of the invention are illustrative and explanatory thereof, and various changes in the details of the illustrated spring-return actuator and the method of using the same may be made without departing from the scope of the invention. For example, a pneumatic vane actuator is not required to wind or unwind the spring 34 of the spring return operator 10. As illustrated in FIG. 7, a device 90 designed specifically for measuring and adjusting spring tension may be utilized wherein the operator 10 may be secured to the device 90 using an adapter 92 and an actuator 94 may be used to insert or release tension on the spring of the operator 10 as measured by a torque measuring load cell 96.

We claim:
1. A rotary spring-return operator comprising:
a housing having a housing aperture;
a cover plate having a cover plate aperture;
a multi-slotted shaft capable of extending through the housing aperture and the cover plate aperture;

a spring capable of being engaged to said shaft and capable of being received within the interior of said housing, wherein the spring is rotatable to a defined position and securable to a slot in the multi-slotted shaft to adjust the preload on the spring return operator;

a retaining band housed in the housing and that contacts the surface of the spring at a single location along an exposed outer circumference of a spiral of the spring;

a support plate disposed between the retaining band and the spring; and an anchor capable of securing the retaining band around the spring;

wherein the rotary spring-return operator is engaged with a pneumatic vane actuator and the spring preload of the rotary spring-return operator is adjustable to accommodate the air supply pressure from the pneumatic vane actuator.

2. The rotary spring-return operator of claim 1, wherein the retaining band is securely fastened around the spring and capable of retaining the maximum possible force which may be stored in the spring.

3. The rotary spring-return operator of claim 1, wherein the retaining band encircles the spring.

4. The rotary spring-return operator of claim 1, wherein the retaining band encapsulates the spring.

5. The rotary spring-return operator of claim 1, wherein the spring is securable to a slot that is associated with a defined amount of preload on the spring return operator.

6. The rotary spring-return operator of claim 1, wherein the multi-slotted shaft comprises a plurality of slots spaced around the multi-slotted shaft at 18 degree intervals.

7. The rotary spring-return operator of claim 6, wherein the multi-slotted shaft comprises five slots.

8. The rotary spring-return operator of claim 1, wherein the multi-slotted shaft comprises a plurality of slots spaced around the multi-slotted shaft at intervals corresponding to successive 4% reductions in spring preload.

9. The rotary spring-return operator of claim 8, wherein the multi-slotted shaft comprises five slots.

10. The rotary spring-return operator of claim 9, wherein the five slots correspond to successive reductions in spring preload of 0%, 4%, 8%, 12%, and 16%.

\* \* \* \* \*